UNITED STATES PATENT OFFICE.

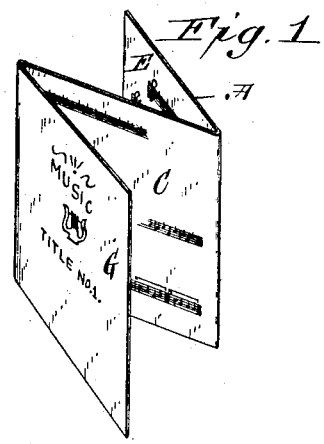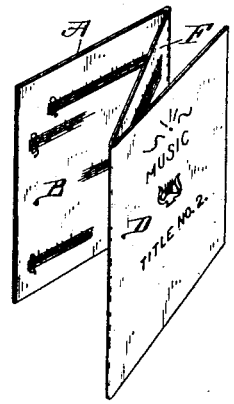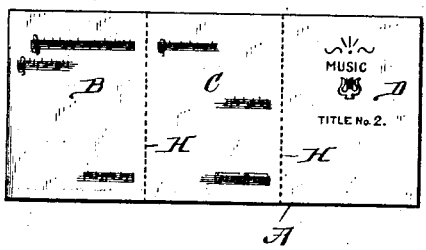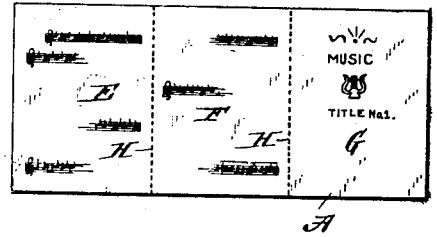

JOHN S. DOBSON, OF BUFFALO, NEW YORK, ASSIGNOR, BY DIRECT AND MESNE ASSIGNMENTS, TO THE NIANTIC SHEET MUSIC COMPANY, OF BUFFALO, NEW YORK, A CORPORATION OF SOUTH DAKOTA.

SHEET-MUSIC.

1,354,176.  Specification of Letters Patent.  Patented Sept. 28, 1920.

Application filed September 24, 1919. Serial No. 326,013.

*To all whom it may concern:*

Be it known that I, JOHN S. DOBSON, a subject of the King of Great Britain, residing at Buffalo, in the county of Erie and State of New York, have invented certain new and useful Improvements in Sheet-Music, of which the following is a specification.

My invention relates to improvements in sheet music, and it has for its object the provision of sheet music comprising a single sheet of paper or other material having a complete piece of music printed on each side thereof with a title page on each side of the piece of music printed on the opposite side, the sheet of music being folded along two lines to provide two two-page pieces of music, with a title page for each.

A further object of my invention is to provide sheet music in one integral piece having two complete pieces of music printed thereon, with a title page for each, the sheet being folded so that the outer side at the rear or front will serve as a title page and so that the sheet music can be opened from either side in the same manner as an ordinary sheet of music, the piece of music corresponding to the title page being exposed when turning the corresponding title page over to open the sheet music.

The invention further consists in certain novel construction and arrangement of parts, as will be hereinafter fully described and claimed.

In the accompanying drawings:

Figure 1 is a perspective view of sheet music constructed in accordance with my invention, showing the title page and a portion of the second page of one piece of music; also a portion of the first page of the other piece of music.

Fig. 2 is a perspective view of the music sheet reversed, showing the title page and a portion of the second page of the other piece of music and the first page of the piece of music having its title page shown in Fig. 1.

Fig. 3 is a face view of the music sheet fully opened or, in other words, as it is arranged when printed, this figure showing one piece of music and the title page of the other piece.

Fig. 4 is a face view reversed from Fig. 3 and showing the piece of music corresponding to the title page of Fig. 3, and showing also the title page of the piece of music sheet in Fig. 3.

Fig. 5 is an edge view of the sheet showing the same opened so that one complete piece of music is disclosed and showing in dotted lines how the pages of said sheet of music may be folded and the pages bearing the second piece of music opened when the sheet music is reversed.

Referring to the drawings in detail, A designates a continuous sheet or strip of paper or other material forming the entire music sheet, the opposite sides of which are printed upon, one side being divided into three equal spaces B, C, D and the other side into three similar spaces E, F, G, which when folded represent six pages of the music sheet. The sheet is adapted to be folded along the dotted lines H so that the pages are separate and distinct, as in the present form of the sheet music now placed on the market and sold at popular prices.

On the divisions or pages B, C, when the entire sheet is folded, one piece of music is printed. On the space D of the same side, the title of the other piece of music is printed, and such other matter as the publisher may desire to print thereon, this being clearly shown in Fig. 3. On the reverse side, the spaces E, F are utilized for the other piece of music, while the space G is utilized for the title of the first-mentioned piece of music and such other matter as the publisher may desire to print thereon.

The three connected sections, as they may be termed, are folded in zigzag form, as shown in Figs. 1 and 2; that is to say, taking the sheet as shown in Fig. 3, the first section having the page B thereon is folded over the second section having the page C thereon, while the third section having the title page of the piece on the reverse side is folded underneath said second section. Therefore, when the sheet music is closed a title page will be at the front and rear, and by turning the folded sheet music over, either title will be exposed. For example, when the sheet of music shown in Fig. 1 is fully folded and placed upon the sheet-music holder of a piano, the title of piece number 1, which is printed on the reverse side of the corresponding piece of music would be exposed, and upon turning over the page on which this title is printed, in the same manner as turning over the title page of an ordinary sheet of music, the full piano score of said corresponding sheet of music will be exposed so that it can be easily played. If, after playing piece number 1, it is desired to play the second piece, it is only necessary to turn over the second page of the piece played, which will carry with it the folded portion of the sheet directly underneath, thereby exposing the title page of the other piece of music. By then turning over this title page, the complete piano score of the corresponding piece of music will be exposed. It is clear therefore that when the sheet of music is folded as directed, either piece may be played by simply turning the proper title page up and turning over the sheet having said title page printed thereon.

By the use of this invention two pieces of music can be printed on the same size pages as are now generally employed in popular price sheet music, with one-fourth less paper, and furthermore, the two pieces may be printed with the same number of printing-press operations now required to print the standard form of sheet music having only a single piece of music. Therefore, by slightly reducing the size of the pages, two sheets of music may be produced at the same cost as a single sheet of music under present methods. If the same size is desired, the increase in the cost of the additional material will be so small as to make it hardly necessary to increase the price of the music sheet over that having a single piece printed thereon. If, however, the slight additional cost of production on each piece of sheet music is to be paid by the purchaser, figuring the same proportion of profits for the producer, the additional cost to the purchaser would be only a very small fraction of what a second sheet of music printed according to present day methods would cost.

Sheet music printed according to this invention can be kept or filed in a more systematic manner and it will be much easier and more convenient to handle any combined two pieces of music than it would to handle such music printed on separate sheets.

From the foregoing, the advantages of this invention will be quite apparent, and they are to the benefit of the producer as well as the user.

Having thus described my invention, what I claim is:—

1. Sheet music formed of a single strip or sheet of material and having a sheet of music printed on each side thereof with the title of each piece of music following and printed on the same side as the other piece of music, the whole being folded to expose of music, the whole being folded to expose the titles at the front and rear so that when opening the folded sheet music, the piece of music corresponding to the exposed title will be brought to view.

2. Sheet music formed of a single strip or sheet of material and having each side divided into three successive sections, the first two sections having one piece of music printed thereon and constituting two pages for said piece of music, and the third section having the title printed thereon of the piece of music on the other side of the strip or sheet, said strip or sheet being folded in zigzag form between sections so as to provide two titles on each of the outer pages when the strip or sheet is folded so that the strip or sheet may be opened at either title to expose the corresponding piece of music.

3. Sheet music formed of a single piece of material folded in zigzag form to provide two outer title pages so that the sheet may be reversed to open up at either title page, two pieces of music being printed on opposite sides of the sheet so that when the folded sheet is opened the piece of music corresponding to the exposed title page will be exposed.

4. Sheet music formed of a single strip or sheet of material and having each side divided into a plurality of sections, one section on each side having the title of a piece of music thereon and the remaining sections on the same side having music printed thereon whose title is on the other side.

5. Sheet music having two pieces of music printed thereon and being formed of a single strip or sheet of material, each side of said strip or sheet being divided into pages with the title of one piece of music on one page and notes of the other piece of music on the other pages, said strip or sheet being folded into zigzag form between pages to expose the title of one piece of music at the front and the title of the other piece of music at the rear of the sheet music.

In testimony whereof I affix my signature.

JOHN S. DOBSON.